J. G. WEISS AND C. KNOTH.
ROLL GRINDING MACHINE.
APPLICATION FILED AUG. 20, 1918.

1,312,881.

Patented Aug. 12, 1919.

J. G. WEISS AND C. KNOTH.
ROLL GRINDING MACHINE.
APPLICATION FILED AUG. 20, 1918.

1,312,881.

Patented Aug. 12, 1919.
6 SHEETS—SHEET 3.

Fig. 6.

Inventors.
Jay G. Weiss,
Conrad Knoth, per
Thomas S. Crane,
ATTORNEY

UNITED STATES PATENT OFFICE.

JAY G. WEISS, OF MONTCLAIR, AND CONRAD KNOTH, OF NEWARK, NEW JERSEY, ASSIGNORS TO HYATT ROLLER BEARING DIVISION, UNITED MOTORS CORPORATION, OF HARRISON, NEW JERSEY, A CORPORATION OF NEW YORK.

ROLL-GRINDING MACHINE.

1,312,881.  Specification of Letters Patent.  Patented Aug. 12, 1919.

Application filed August 20, 1918. Serial No. 250,631.

*To all whom it may concern:*

Be it known that we, JAY G. WEISS, residing at 16 North Mountain avenue, Montclair, Essex county, State of New Jersey, and CONRAD KNOTH, residing at 173 Jelliff avenue, Newark, county of Essex, and State of New Jersey, both citizens of the United States, have invented certain new and useful Improvements in Roll-Grinding Machines, fully described and represented in the following specification and the accompanying drawings, forming a part of the same.

This invention relates to a machine for grinding cylindrical roll-blanks by passing the same between the opposed edges of cylindrical grinding-wheels.

The present invention consists partly in the means for mounting and adjusting a pair of cylindrical grinding-wheels, partly, in the combination, in the same machine, of a plurality of pairs of grinding-wheels having the edges of the wheels in each pair arranged in line with the edges of the wheels in the other pairs, and means operated automatically to feed cylindrical roll-blanks progressively and continuously between the wheels of all the pairs.

The invention is particularly applicable to the grinding of roll-blanks formed each of a spirally wound strand, which construction confers a certain degree of elasticity upon the relatively short roll.

When the roll-blanks of such rolls are subjected to a single grinding operation by two opposed grinding-wheels, the irregularities in the roll-blank cannot be wholly and effectively removed by such single operation, as the elasticity of the roll-blank permits its coils to yield somewhat during the grinding operation.

The present invention provides means for subjecting such roll-blanks successively to several grinding operations by means of a plurality of pairs of grinding-wheels having the edges of the wheels in each pair opposed, and arranged in line with one another to operate consecutively upon the same roll-blanks at a greater distance apart than the length of the roll-blanks.

With such an arrangement of grinding-wheels a guide is extended between the opposed faces of the wheels, and beyond the sides of the wheels, so as to form a continuous support for the roll-blanks in their passage through all of the grinding-wheels and to expose each roll-blank intermediate to adjacent pairs of grinding wheels to permit their removal, inspection and gaging.

To render the machine wholly automatic, continuously rotating feed-rolls are arranged adjacent to the guide where projected from the first pair of grinding-wheels, and a hopper with automatic means is provided to deliver the roll-blanks successively to such feed-rolls.

In such a grinding-machine the bed which supports the grinding-wheels is extended transversely to the guide for the roll-blanks, and at least one of the wheels is supported adjustably to move it to and from the other wheel, either to compensate for wear upon the rims of the wheels or to admit roll-blanks of various diameters.

The adjustment for wear requires to be very fine, and it is therefore effected by a feed-screw with a slow driving-wheel journaled detachably to the shank of the screw, such driving-wheel being turned slowly, as by the operation of a worm, when adjusting the driving-wheels to compensate for wear.

When setting the wheels for rolls of different sizes, the delay involved in the use of such a slow rotation of the feed-screw is avoided by disconnecting the slow driving-wheel from the shank of the screw and applying a crank, or other means, directly to the said shank to turn the screw directly by hand, The invention includes the various features referred to, and certain details of construction which are set forth in the claims.

The invention will be understood by reference to the annexed drawing, in which.

Figure 1:
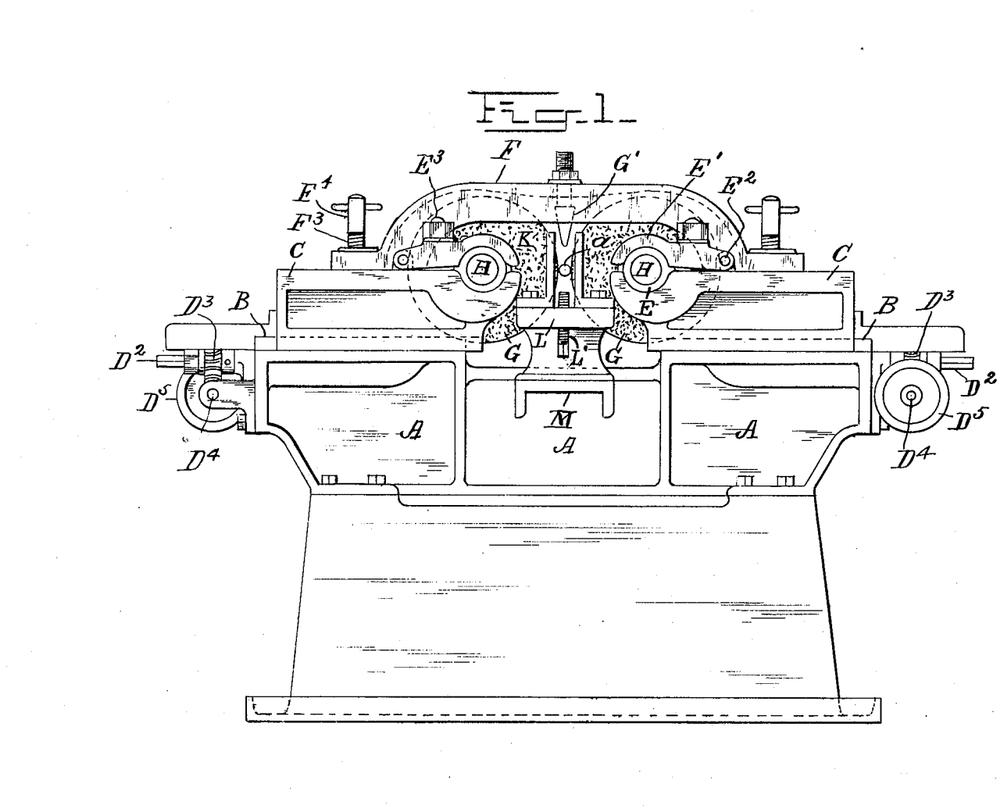
Figure 1 is an elevation of the parts at one end of the triple grinding machine shown in Fig. 6, with the feeding devices omitted.

The grinding parts shown in Fig. 1 comprise a bed A having ways B upon its top to which slides C are fitted and provided each with a feed-screw D. Each slide is provided with a pair of bearings E with a grinder-spindle H mounted to turn therein, and a grinding-wheel G secured upon each spindle to rotate between the said bearings.

One of the grinding-wheels in each pair is driven at high speed by a pulley $w$, but the other is driven very slowly in the same direction by a sprocket-wheel $w'$, to retard the rotation of the roll-blank and enable the fast grinding-wheel to operate longer and more effectively upon the blank.

The edges of the grinding-wheels are opposed, and are adjusted at a suitable distance apart to press upon the opposite sides of the roll-blanks $a$.

The bearings E have a globular body fitted to a socket, and clamped thereon by a cap E' which is hinged at one end by pivot $E^2$ and clamped upon the bearing by a clamp-screw $E^3$. The globular form of the bearing-body permits the two bearings upon each spindle to line with one another automatically, and the hinging of the cap E' permits it to be loosened and thrown back so that the grinding-wheel with its spindle and bearings can be lifted for the removal and changing of the grinding-wheels.

A guard F is extended over the tops of the two grinding-wheels, and its feet attached movably to the slides by a slotted spring connection, a bolt F' being extended through a slot $F^2$ in each foot, and the foot clamped elastically upon the slide by a spring $F^3$ and nut $F^4$. The spring connection of the guard to each slide permits the slides to be adjusted without manipulating the connections of the guard. The grinding-wheels are supplied with a profusion of water during the grinding operation, which is confined to the wheels by the guard and drops to the bed below.

The water supply is conveniently directed upon the junction of the grinding-wheels by a water-nozzle G' inserted through the top of the guard and directed toward such junction, the outer end of the nozzle being properly fitted to receive a hose or pipe connection. Each feed-screw D is journaled in a bearing D' at the outer end of the ways B, and its projecting shank $D^2$ is shown with a worm-wheel $D^3$ fitted movably thereon.

A worm having a worm-shaft $D^4$ is mounted to operate the worm-wheel, the said shaft having a hand-wheel $D^5$ to manipulate the worm when making a fine adjustment of the grinding-wheel. A conical clutch $D^6$ is connected to the shank $D^2$ and fitted to the worm-wheel, and is clamped thereto by a nut $D^7$, when the slow screw-movement is desired.

The outer end of the screw-shank $D^2$ is fitted to receive a crank, by which the screw may be turned rapidly when the clutch is detached from the worm-wheel; and the grinding-wheels thus quickly moved to and from one another.

A proper relation of the grinding-wheels to one another can obviously be effected by making the bearings of one wheel stationary and of the other adjustable; but the use of guides extended between the grinding-wheels, and feeding mechanism for delivering the roll-blanks to such guides, makes it necessary that each of the grinding-wheels should be adjusted independently, to maintain corresponding relations to the center of the roll-blanks.

Figure 6:
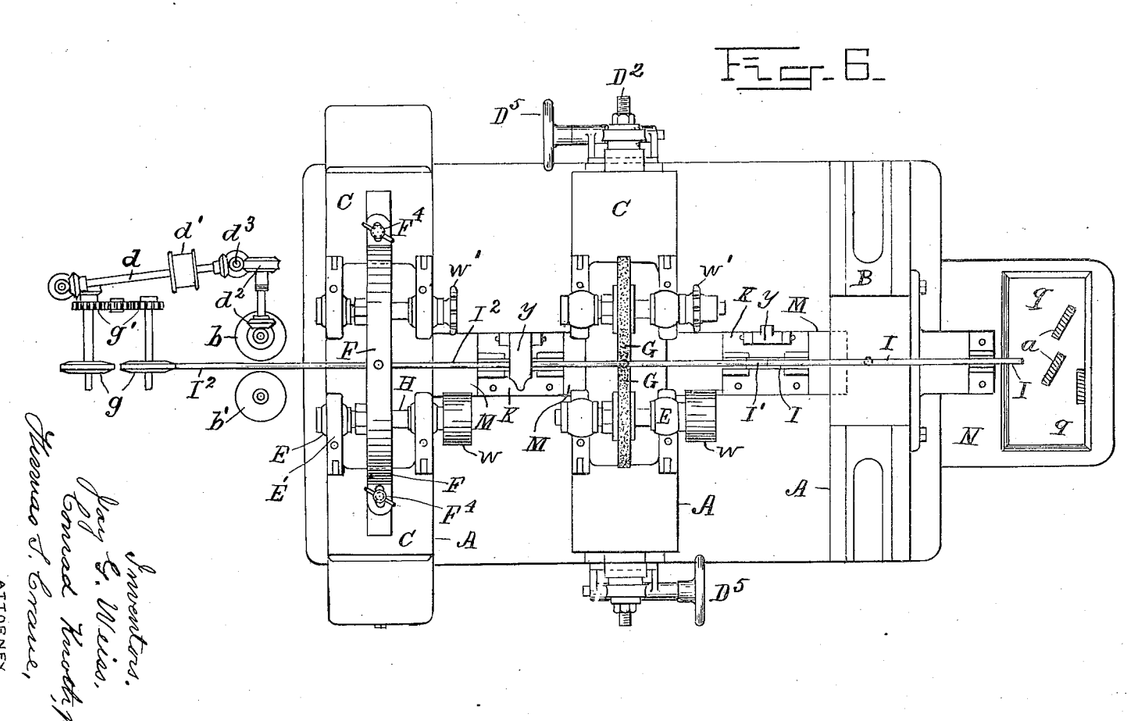
Fig. 6 is a plan of a grinding machine with three pairs of grinding wheels.

Three pairs of grinding-wheels are shown in Fig. 6, requiring means to advance the roll-blanks from one grinder to another. The guard F covers the grinding-wheels of the first pair, but on the third bed the wheels and the slides C are omitted to exhibit the form of the bed A clearly.

Figures 2, 4:
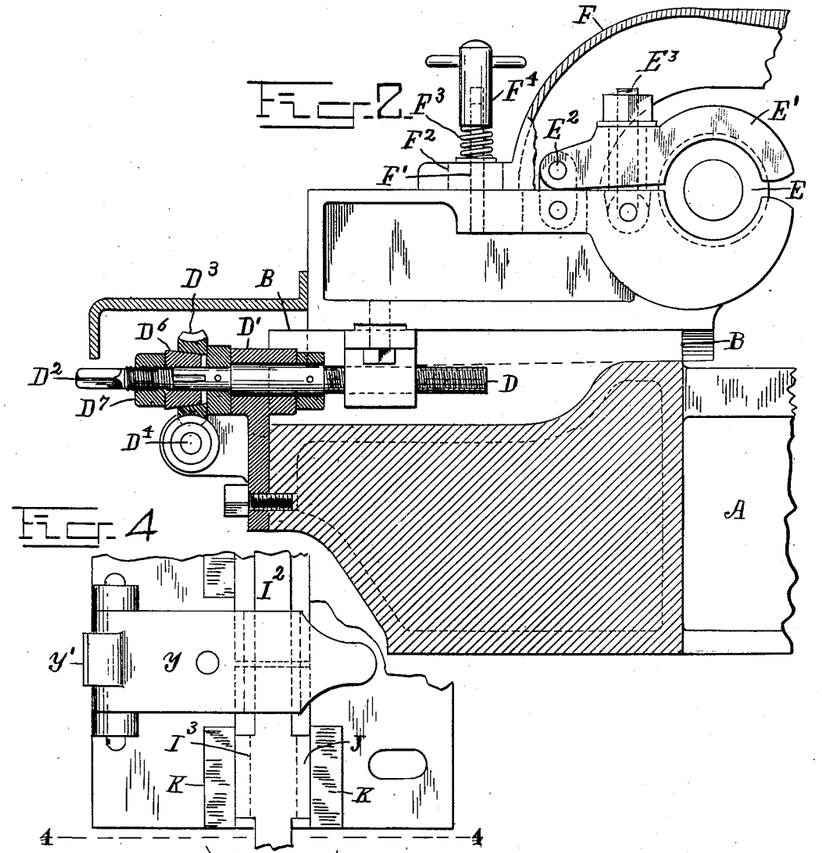
Fig. 2 shows the left hand half of such parts upon a larger scale, with the parts in section where hatched, at the middle line of the bed supporting the guiding wheels.
Fig. 4 is an end view of one of the guide carriers.
Figure 3:
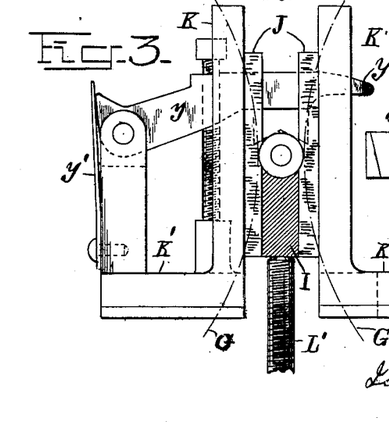
Fig. 3 is a side view of one end of a guide bar.
Figure 5:
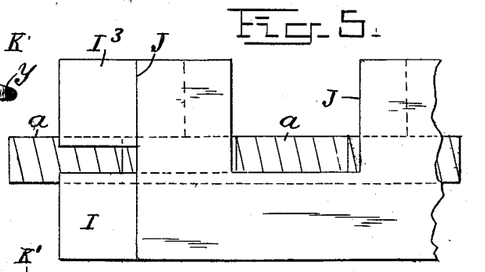
Fig. 5 is a plan of the nearer half of the same.

For such a multiple grinding machine the guide is made of sections I, I', $I^2$, each of which extends between the edges of one pair of grinding-wheels and laterally therefrom to a point between the wheels, where a support K, K' (which is shown in Figs. 1, 4 and 5) is provided for the adjacent ends of two of the guide-bars.

Roll-blanks designed for rolls in a roller-bearing are only a few inches in length, and the necessary mountings for the grinding-wheels set them farther apart than the length of most of such roll-blanks, and necessitates the extension of guides between the several pairs of grinding-wheels to support the roll-blanks in their passage from one to another.

Supports for the guides are therefore provided intermediate the pairs of grinding-wheels.

Guides of different cross-section are provided to support roll-blanks of different diameters, and all of such guides are fitted interchangeably to the supports.

The guides, as shown in Figs. 4 and 5 are formed with upper and lower guide-bars marked I³ in these figures, and of less thickness than the diameter of the roll-blank, so that the opposite sides of the roll may contact with the edges of the grinding-wheels represented by the dotted lines G in Fig. 4.

Tie-plates J are attached to opposite sides of the bars I to hold them in the proper relation, the space between such tie-plates and the bars forming a round channel for the passage of the roll-blanks. These plated portions of the guides are the parts fitted to the guide-supports, which are made in two halves K to fit against the sides of the tie-plates, and have each a foot K' fitted to a seat L supported intermediate to the beds B, upon a projection from one or both of the adjacent beds.

In Figs. 1 and 6, a cross-bar M is extended between two of such beds to sustain such guide-support. A screw L' is provided to adjust the guide vertically between the grinding-wheel faces.

In Fig. 6, one section of the guide is extended over each of the beds B and the end-sections I² and I are projected respectively into a feeding device, and a collecting stage N where the finished rolls are deposited. Between two of the guide-supports K a gap is cut in the upper guide-bar I³ to permit the lifting out of a roll-blank after the operation of one pair of grinding wheels, to gage the blank, and change the adjusting of the grinding-wheels if necessary. A cap $y$ is held upon the banks in such gaps by a spring $y'$, which cap can be lifted to remove a blank when necessary.

It will be observed in Fig. 6 that the several pairs of grinding wheels are mounted at a considerable distance apart (much greater than the length of the blanks) to afford room for the spindle bearings E of the wheels and the open portion of the guide to which the cap $y$ is applied.

For these causes the pairs of grinding wheels are set much farther from one another than the length of the roll blanks.

A great advantage is secured in affording access to the rolls as they pass from one pair of grinding wheels to another, as they can be accurately gaged and the successive grinding wheels adjusted whenever required to reduce the rolls to the desired size.

The provision of such guides, delivering the roll blanks successively to the several pairs of grinding wheels enables the machine to repeatedly and automatically grind the same roll blanks, and thus reduce them more accurately to the same diameter than is possible with a single pair of grinding wheels.

The feeding device consists of two opposed feed-rolls $b$, $b'$, having bearings $c$ and $c'$ adjustable to and from one another to grip roll-blanks of different diameter, and rotated continuously by a pulley $d'$ shown in Fig. 6. The edges of these feed-rolls project toward opposite edges of the guide-bar I² so as to propel roll-blanks lying upon the guide.

Figures 7, 8, 9, 10:
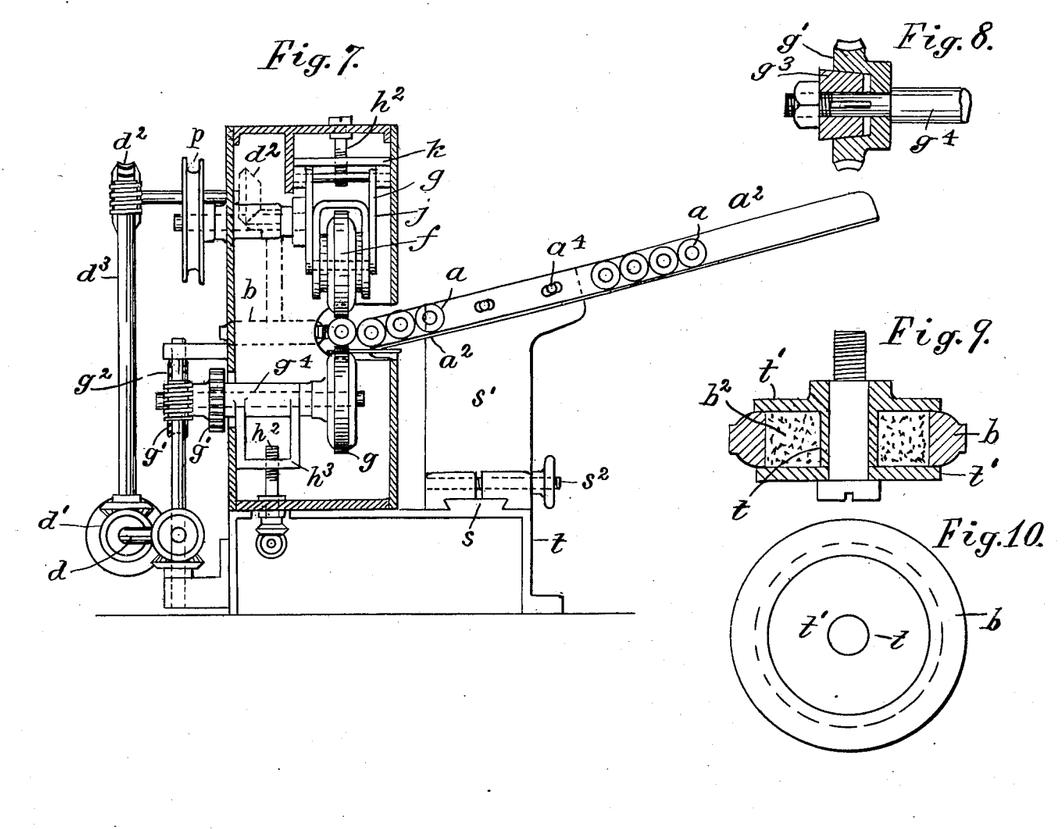
Fig. 7 is an elevation of the automatic feeding-device.
Fig. 8 is a section of the clutch on shaft $g^4$.
Fig. 9 is a section of the yielding feed-roll.
Fig. 10 is a plan of the roll-rim.
Figure 11:
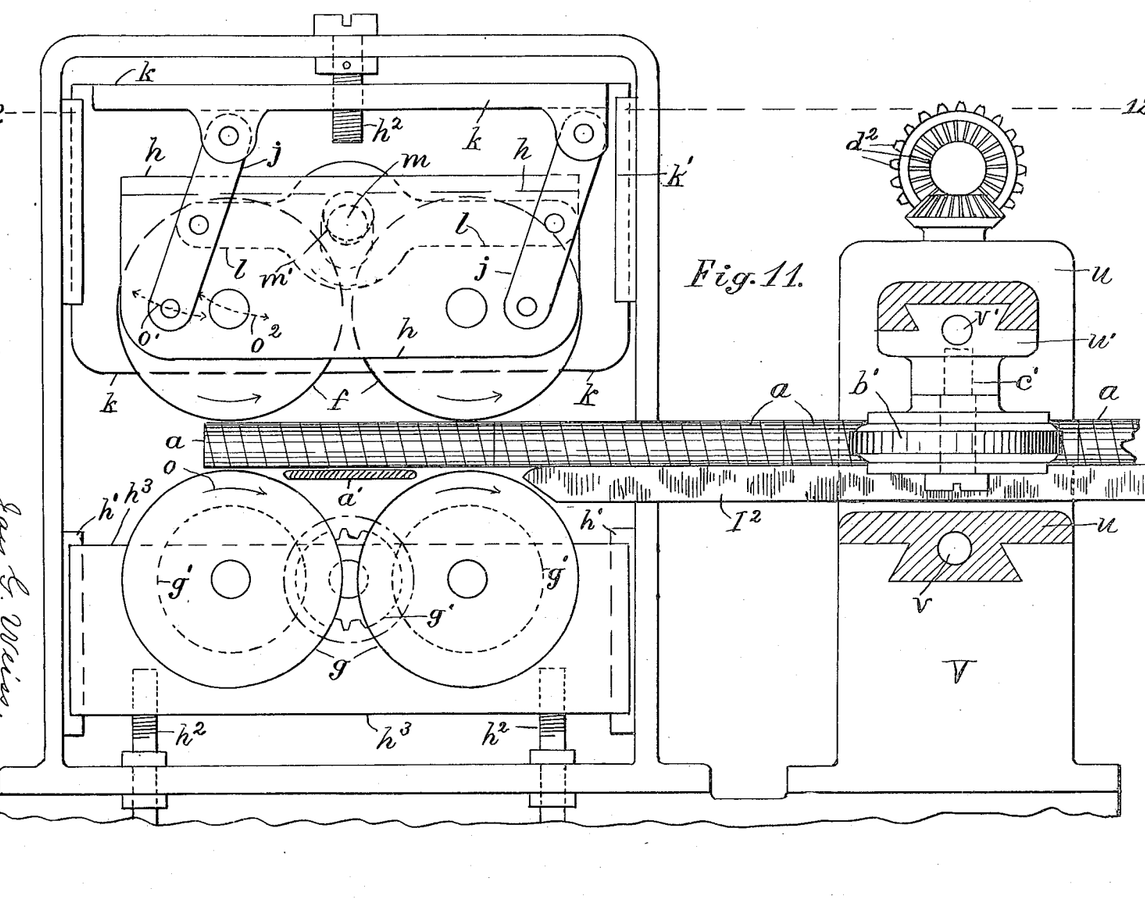
Fig. 11 is an elevation of the feeding-device in section on line 11—11 in Fig. 12, which is a plan of the same in section on line 12—12 in Fig. 11.

Delivery-wheels $f$ and $g$ are arranged respectively above and below the path of the roll-blanks to deliver them to the guide I² and feed-rolls $b$, $b'$. The bearings of the wheels $g$ are adjustable, and a shelf $a'$ is located between their upper edges, as shown in Fig. 7, to receive roll-blanks $a$ successively from a chute $a^2$.

To enable these delivery-wheels to grasp roll-blanks of different diameter and to admit the roll-blanks successively from the hopper, the bearings of the wheels $f$ are mounted in a swing-frame $h$ supported by links $j$ in an adjustable housing $k$. The links ore oscillated by a tie-bar $l$ actuated by a rotating crank $m'$ and the swinging of the links when thus oscillated moves their lower ends through the space included by the dotted curve $o'$, and correspondingly moves the frame $h$ in the dotted curve $o^2$.

This raises and lowers the wheels $f$ in such manner that when they are raised, a roll can move from the hopper to the shelf $a'$ in line with the guide $r^2$.

The crank-pin $m'$ is rotated by a crank-shaft $m$ and pulley $p$ (Fig. 12) having a loosely fitted belt or cord which forms a friction-driver, and permits the crank-pin to stand still when the upper wheels are pressed upon the top of a roll-blank, while exerting a yielding pressure upon the roll-blank.

The lower delivery-wheels $g$ are rotated continuously by gearing $g'$ and $g^2$, and the upper delivery-wheels operate to press the roll-blanks upon the lower wheels, such pressure sufficing to force them forward to the feed-rolls $b$. To permit the wheels $g$ to stop when the movement of the roll-blanks through the grinders may be accidentally obstructed, the driving-shaft $g^4$ is coupled to its driving-wheel $g^7$ by a friction-clutch $g^3$ (Fig. 8), upon which the driving-wheel $g'$ may slip when necessary.

The wheels $g$ are carried by a frame $h^3$ which is held adjustably in guides $h'$ so that it can be adjusted at pleasure by screws $h^2$, so that the delivery-wheels may pinch the roll-blank firmly when the crank-pin is in its mid position as shown in Fig. 7. The frame $h$ requires no support excepting the links $j$, as it merely moves the wheels $f$ to and from the roll-blank. The bottom of the chute terminates, as shown in Fig. 7, close to the shelf $a'$, and a stop is in practice provided to arrest the roll when it has moved beneath the delivery-wheels $f$. The shelf is, in practice, supported adjustably so that it may operate with roll-blanks of different sizes.

The roll-blanks require support only at their ends when placed in the chute, and the latter is therefore shown formed of two angle-bars $a^2$ which are attached to standards by bolt and slot connection $a^4$ which enables them to be adjusted to and from the delivery-wheels and the shelf.

A dovetail strip $s$ is shown upon the bed $t$ in Fig. 7 and the standards $s'$ (see Fig. 12) are movable to different distances apart on the strip, and can be clamped when adjusted by a pinch-screw $f^2$.

The delivery-rolls and the chute are thus adapted to operate with roll-blanks varying considerably both in length and diameter.

The feed-rolls $b$, $b'$ are journaled upon carriages $u$, $u'$, movable on a standard V by screws $v$ and $v'$. These screws set the feed-rolls so as to press upon and grip the roll-blanks and propel them forcibly forward, which movement carries the blanks through all the grinding-wheels, whatever number be used, and delivers them to the pan $q$ at the farther end of the machine.

Figure 12:
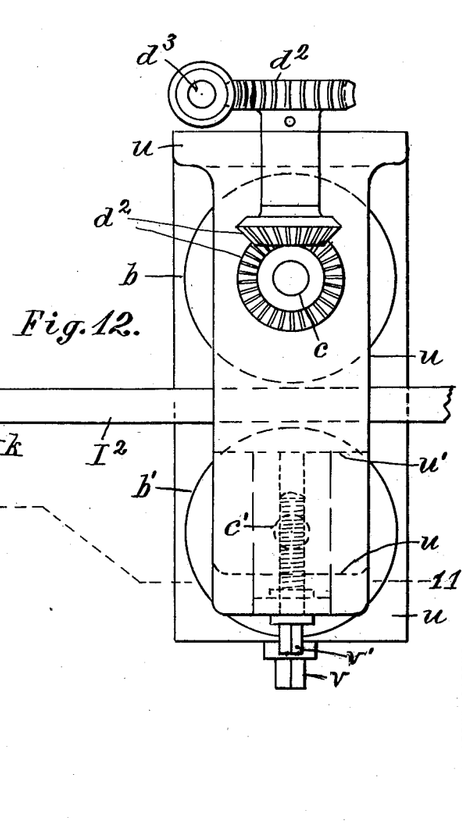

The feed-roll $b$ is positively rotated, as shown in Fig. 12, by connections $d^2$, $d^3$, to a driving-shaft $d$ having a driving-pulley $d'$ thereon (see Fig. 6), and the feed-roll $b'$ does not require to be rotated, but is formed with an india-rubber annulus $b^2$ between its hub $t$ and rim $b$, which is shown in Figs. 9 and 10.

This rubber annulus permits the periphery of the wheel to yield, or press toward its pivot, to compensate for variations in the shape and dimensions of the roll-blanks, as such roll-blanks for a given sized roll vary slightly in diameter and form before they are ground, and would not be satisfactorily gripped by the feed-rolls except for such compensation.

The rubber annulus is inclosed by cheeks $t'$ which wholly exclude the grit which abounds upon a grinding machine, and which would interfere with the movement of the carriage $u'$ for the roll $b'$, if it were merely provided with a pressure-spring to produce the yielding grip desired.

The plurality of successively acting grinders permits the gradual removal of the inequalities of the roll-blanks, and secures their automatic reduction to nearly perfect uniformity, which cannot be effected by a single grinding operation.

Several of such plural or so-called "tandem-grinders" can be attended by a single operator, as the machine requires no attention excepting the supplying of the hopper with roll-blanks.

To support a plurality of beds and grinders in tandem relation to one another requires two features which are furnished by our invention, first, a base by which a plurality of the grinder-beds A can be held in operative relation, and second, means carried by the several beds to adjust the grinding-wheels upon each in line with one another so as to operate successively upon the same roll-blanks.

Such a base is shown at A' in Figs. 1 and 6, with the several beds A attached thereto by flanges $z$ and bolts $z'$, and the attachments of the slides C furnish the means to aline the grinding-wheels with one another as required; and the tandem machine is thus adapted to operate automatically and repeatedly upon the same roll-blanks.

Having thus set forth the nature of the invention what is claimed herein is:

1. A grinding machine adapted to repeatedly grind a continuous series of roll blanks, and having a plurality of pairs of grinding wheels with the edges of the wheels in each pair opposed and arranged in line with one another, supporting guides extended between the several pairs of wheels with upper and lower guide bars forming a channel in the guides to lead the roll blanks successively from one pair of wheels to another and the distance between the several pairs of wheels being greater than the length of the roll blank.

2. A grinding machine adapted to repeatedly grind a continuous series of roll blanks, and having a plurality of pairs of grinding wheels with the edges of the wheels in each pair opposed and arranged in line with one another, roll guides having upper and lower guide bars projected between the edges of the wheels parallel with their axes and extended between the several pairs to lead the roll blanks successively from one pair to another, the supports for the said guides arranged intermediate to the pairs of wheels, and the upper guide bar having a gap intermediate to the pairs of grinding wheels to expose the blanks and permit their removal when desired for gaging their diameter.

3. In a grinding machine, the combination, with a longitudinally extended base, of a plurality of beds extended transversely across the base and a pair of grinding wheels mounted upon each of the said beds, the edges of the wheels being in line with one another to operate consecutively upon the same cylindrical roll-blanks.

4. In a grinding machine, the combination, with a longitudinally extended base, of a plurality of beds supported transversely upon the base, a pair of grinding wheels mounted upon each of the said beds with their edges opposed and the edges of the wheels in the several pairs arranged in line with one another, and roll-guides extended between the edges of the wheels and sustained by supports intermediate to the pairs of wheels.

5. In a grinding machine, the combination, with a plurality of transversely extended beds and a pair of grinding wheels having spindles mounted in bearings upon each of the said beds with the wheel-edges of each pair opposed and the edges of the several pairs arranged in line with one another, of guides extended from one pair to another to lead the rolls progressively through the same, each bearing having a clamp securing it detachably upon the bed, whereby the spindles are readily removed to change the grinding wheels.

6. In a grinding machine, the combination, with a pair of grinding wheels having their edges opposed, of means for rotating the grinding wheels with their opposed edges moving positively in the same direction, one of said wheels being rotated rapidly and the opposed wheel at a relatively slow speed.

7. In a grinding machine, the combination, with a pair of grinding wheels having parallel spindles and their edges opposed, of a pulley for rotating one of the wheels at a relatively high speed, and a sprocket-wheel with chain for rotating the opposed wheel at a relatively slow speed.

8. In a grinding machine, the combination, with a suitable bed, of slides movable to and from one another upon the bed, a pair of bearings upon each slide with a wheel-spindle fitted thereto and grinding wheels upon the spindles with their edges opposed, means for adjusting the slides to and from one another, and a guard extended over the wheels with means for attaching the ends of the guard movably to the said slides.

9. In a grinding machine, the combination, with a suitable bed, of a pair of grinding wheels having parallel spindles and their edges opposed, a pair of bearings sustained upon the bed to carry each of said spindles, at least one pair of the bearings being adjustable to and from the other pair, a screw for adjusting such movable bearing, a slow driving-wheel with clutch connecting it detachably with the shank of the screw, and means for rotating the screw independently of the said wheel when unclutched from the said shank.

10. In a grinding machine, the combination with a suitable bed, of slides movable to and from one another upon the bed, a pair of bearings upon each slide with a wheel-spindle fitted thereto and grinding wheels upon the spindle with their edges opposed, a screw connected to each of the slides for adjusting the same and having a shank with a worm-wheel fitted loosely thereto, a clutch to connect the worm-wheel with the screw, a worm fitted to the worm-wheel with means to turn the same, and means for turning the screw independently of the worm-wheel when the worm-wheel is unclutched from its shank, whereby each of the grinding-wheels may be adjusted independently to and from the other.

11. In a grinding machine, the combination, with a plurality of pairs of grinding wheels having their grinding edges set in line with one another, of a continuous roll-guide extended between the grinding edges of all the said wheels, feed-rolls adjacent to the first pair of grinding wheels rotated to grasp the roll-blanks and propel them along the said guide and between all of the grinding wheels successively, and means for successively delivering the roll-blanks to the said feed-rolls.

12. In a grinding machine, the combination, with a pair of grinding wheels having their grinding edges opposed, of a guide extended between the opposed edges and outwardly therefrom to receive the roll-blanks, continuously rotating feed-rolls adjacent to the guide to propel the roll-blanks thereon, and delivery-wheels having a hopper to deliver roll-blanks thereto, and the said delivery-wheels actuated to intermittently grasp the successive roll-blanks and deliver them to the feed-rolls.

13. In a grinding machine, the combination, with a pair of grinding wheels having their grinding edges opposed, of a guide extended between the opposed edges and outwardly therefrom to receive the roll-blanks, continuously rotating feed-rolls adjacent to the guide to propel the roll-blanks thereon, a bottom delivery-wheel sustained below the path of the roll-blanks and rotated continuously, a movable frame with upper delivery-wheel journaled therein, a friction-driver with means to reciprocate the frame vertically, a hopper to deliver roll-blanks to the delivery-wheels, and the reciprocating movement of the upper delivery-wheel permitting the entrance of the roll-blanks successively between the delivery-wheels as each roll-blank is discharged from the hopper.

14. In a grinding-machine, the combination, with a pair of grinding-wheels having their grinding edges opposed, of a guide extended between the opposed edges and outwardly therefrom to receive the roll-blanks, continuously rotating feed-rolls adjacent to the guide to propel the roll-blanks thereon, and delivery-wheels having a hopper to deliver roll-blanks thereto, and a friction-driver to rotate the delivery-wheels, and adapted to slip when the movement of the roll-blanks from the feed-rolls is obstructed.

15. In a tandem roll-grinding-machine, a longitudinally extended base, a plurality of beds secured transversely of said base, and a pair of grinding-wheels mounted upon each of the said beds, with means to adjust the grinding-wheels upon each into line with those upon the other beds.

In testimony whereof we have hereunto set our hands.

JAY G. WEISS.
CONRAD KNOTH.